United States Patent
Arndt et al.

(10) Patent No.: US 8,555,631 B2
(45) Date of Patent: Oct. 15, 2013

(54) HYDRAULIC TRANSMISSION CIRCUIT

(75) Inventors: Kyle Arndt, Reno, NV (US); Jean Heren, Margny les Compiegne (FR)

(73) Assignee: Poclain Hydraulics Industrie, Verberie (FR)

( * ) Notice: Subject to any disclaimer, the term of this patent is extended or adjusted under 35 U.S.C. 154(b) by 926 days.

(21) Appl. No.: 12/699,186

(22) Filed: Feb. 3, 2010

(65) Prior Publication Data

US 2010/0193279 A1   Aug. 5, 2010

(30) Foreign Application Priority Data

Feb. 4, 2009 (EP) .................................. 09152069

(51) Int. Cl.
*B60K 17/356* (2006.01)
*F16H 61/44* (2006.01)

(52) U.S. Cl.
USPC ................................ 60/484; 60/424; 60/425

(58) Field of Classification Search
USPC ............. 60/424, 425, 426, 483, 484; 180/308
See application file for complete search history.

(56) References Cited

U.S. PATENT DOCUMENTS

| | | | |
|---|---|---|---|
| 3,435,616 A * | 4/1969 | Waldorff | 60/424 |
| 3,446,240 A * | 5/1969 | Schou | 60/424 |
| 6,099,273 A * | 8/2000 | Allart et al. | 60/425 |
| 6,276,468 B1 * | 8/2001 | Essig et al. | 60/484 |
| 6,488,111 B1 * | 12/2002 | McKenna et al. | 180/308 |
| 6,662,557 B1 | 12/2003 | Cunningham et al. | |
| 8,185,279 B2 * | 5/2012 | Ryyppo | 60/425 |
| 8,333,069 B2 * | 12/2012 | Heren et al. | 60/425 |
| 2006/0113136 A1 * | 6/2006 | Donaldson et al. | 180/308 |

FOREIGN PATENT DOCUMENTS

| EP | 0 547 947 A1 | 6/1993 |
|---|---|---|
| EP | 0 921 309 A1 | 6/1999 |

OTHER PUBLICATIONS

European Search Report: EP 09 15 2069.

* cited by examiner

*Primary Examiner* — Thomas E Lazo
(74) *Attorney, Agent, or Firm* — Ladas & Parry LLP

(57) ABSTRACT

Hydraulic transmission circuit with N hydraulic motors, wherein each motor comprises N sub-motors, all $N^2$ sub-motors having the same cylinder displacement.

Figure 1:
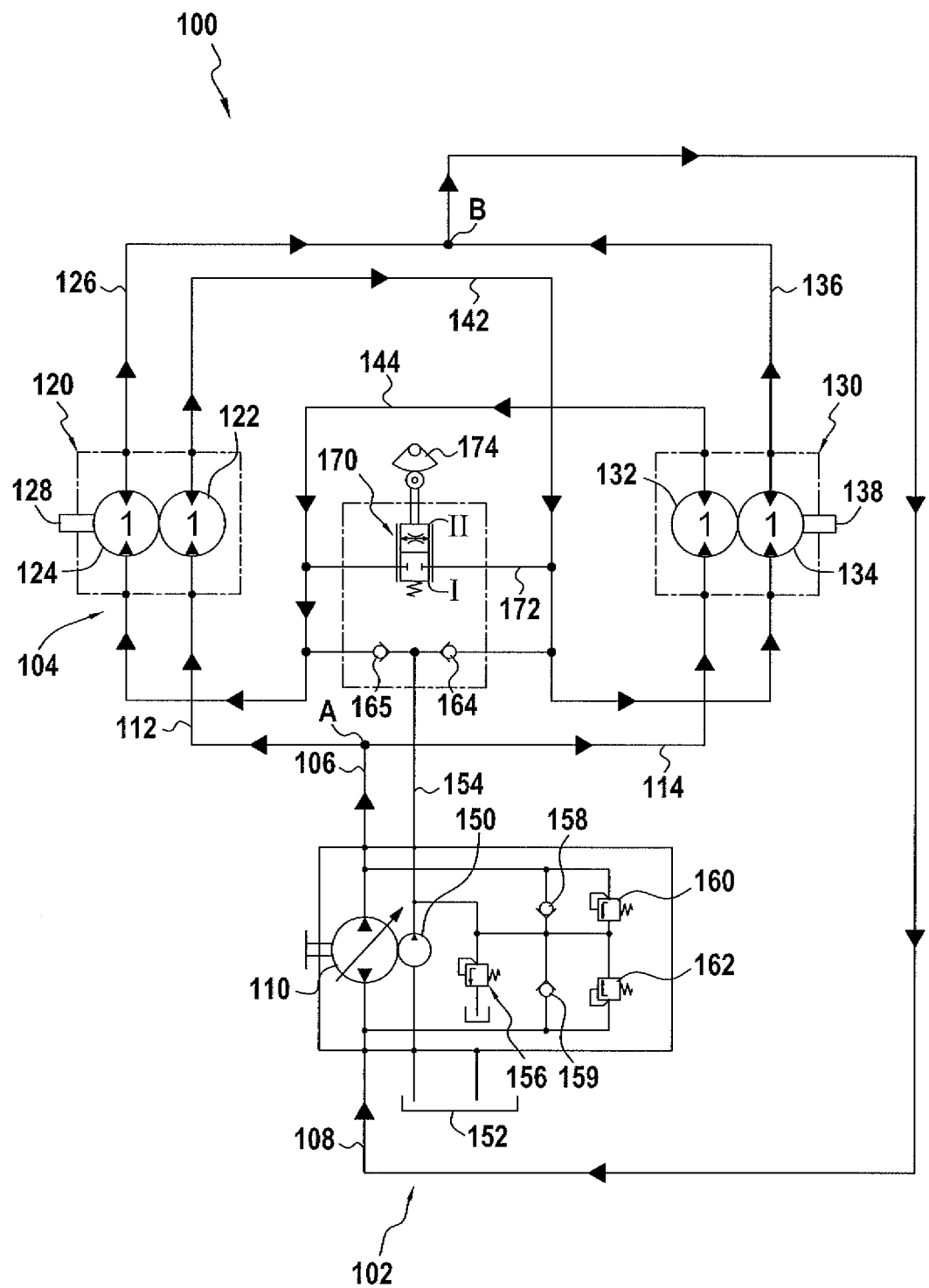

The circuit comprises one common feed duct, adapted for receiving fluid under pressure, and to which one feed sub-motor of each motor is connected; one common exhaust duct, adapted for ejecting exhaust fluid, and to which one exhaust sub-motor of each motor is connected; N serial ducts, each serial duct connecting a feed, first sub-motor to an exhaust, N-th sub-motor via N−2 interposed sub-motors, these N connected sub-motors respectively belonging to the N motors.

This circuit allows tight synchronization of the N hydraulic motors.

14 Claims, 9 Drawing Sheets

HYDRAULIC TRANSMISSION CIRCUIT

The invention relates to a hydraulic transmission circuit comprising several motors driving different rotary organs of a vehicle.

Many machines and vehicles nowadays are equipped with hydraulic transmission circuits, used to power two or more rotary organs of the vehicle, such as wheels. For sake of simplicity, wheels will be cited hereafter as a typical rotary organ driven by the motor or motors. Of course, the same reasoning also applies when the motors are used to drive other rotary organs, such as turrets, propellers, etc. Moreover, references to 'vehicles' will more generally also include other kinds of machines, for instance concrete ride-on trowels.

When more than one wheel is powered, the speed of the wheels which are driven by the motors has to be synchronized. In many vehicles, a medium synchronization is sufficient, and it does not really matter if there is some discrepancy between the wheels, or if a slip occurs from time to time between the wheels.

However, in some vehicles, it is strictly required that an equal speed is met by the different wheels driven by the motors. It is the case for instance in some vehicles wherein, if the speed of a wheel is faster than the speed of the other wheels, it leads the vehicle to draft, and finally have a tendency to turn left or right in a not-tolerable manner.

A ride-on power trowel is an example of such a vehicle. In the trowel, the organs which are to be synchronized are not wheels but two rotors with multiple blades, usually 4, 6, 8 or 10 blades. During the works, the trowel has to go straight. Therefore, the two rotors thereof have to be perfectly synchronized.

The strict synchronization required by such vehicles is traditionally realized by complex mechanical transmissions, comprising belts, pinions, chains, etc. The maindrawback of such transmissions is their complexity, which leads to high costs and frequent breakdowns.

Another form of synchronization, or coupling, is disclosed in U.S. Pat. No. 6,662,557. For synchronizing two hydraulic motors, this patent suggests using two motors with two sub-motors. Two sub-motors of respectively the two motors are coupled together via a coupling circuit which links the two associated sub-motors, the outlet of each sub-motor being connected to the inlet of the other sub-motor, forming thereby a closed loop circuit.

Such a coupling circuit has the main drawback that the fluid running in the closed circuit tends to heat up, reaching high temperatures which may harm the components of the circuit. Moreover, with time the fluid gets polluted, therefore it is necessary to include an additional filter to ensure that the fluid remains reasonably clean. Accordingly, the cost of the transmission circuit is increased.

Lastly, the main drawback of this circuit is the following. Distinct motors, or more precisely the sub-motors thereof, never have exactly the same displacement. Therefore, in said closed loop comprising to two sub-motors, a first sub-vehicle very often has a displacement slightly superior to the displacement of the other sub-motor.

Despite this difference, in stable, continuous operation of the circuit, an equilibrium is usually found by having a higher pressure in one branch of the circuit, compared with the other branch of the circuit (one branch being the duct between two sub-motors); and/or by injecting fluid using the feed pump, or retrieving fluid through pressure release valves or as leaks of the motor, in order to limit the pressure to acceptable values.

The pressure difference between the two branches of the circuit creates antagonist torques between the sub-motors inside the motors. It further creates antagonist torques between the wheels driven by the two motors. All these useless strains create wear of the motors, and poor efficiency of the hydraulic transmission.

The object of the invention is accordingly to define a hydraulic transmission circuit, with a number N of hydraulic motors, N being an integer superior or equal to 2, which permits a strict synchronization of rotary organs driven by the N motors (for instance wheels), without the above-mentioned drawbacks such as an excessive heat dissipated by the circuit, and pressure differences leading to antagonist torques and a poor efficiency of the hydraulic transmission.

To meet this objective, in the hydraulic transmission circuit, each motor comprises N sub-motors, all $N^2$ sub-motors having the same cylinder displacement;
the circuit comprises one common feed duct, adapted for receiving fluid under pressure, and to which one feed sub-motor of each motor is connected;
one common exhaust duct, adapted for ejecting exhaust fluid, and to which one exhaust sub-motor of each motor is connected;
N serial ducts, each serial duct connecting a feed, first sub-motor to an exhaust, N-th sub-motor via N−2 interposed sub-motors, these N connected sub-motors respectively belonging to the N motors.

Advantageously, this circuit provides a strict synchronization of the motors.

It should be further noted that the circuit may comprise other motors than said N motors.

In the above-mentioned definition, a serial duct between two elements is a fluid duct connecting directly or not the two elements, without addition or subtraction of fluid, at least in a considered operating mode of the circuit.

Since the circuit does not comprise a closed loop, heating of the fluid is avoided.

A simple implementation of the invention is as follows: A hydraulic transmission circuit comprising two hydraulic motors, each motor having a feed sub-motor and an exhaust sub-motor, all four sub-motors having the same cylinder displacement, the circuit comprising
one common feed duct, adapted for receiving fluid under pressure, and to which the two feed sub-motors are connected;
one common exhaust duct, adapted for ejecting exhaust fluid, and to which the two exhaust sub-motors are connected;
two serial ducts, a first serial duct connecting the outlet of the feed sub-motor of the first motor to the inlet of the exhaust sub-motor of the second motor, and a second serial duct connecting the outlet of the feed sub-motor of the second motor to the inlet of the exhaust sub-motor of the first motor.

In an embodiment, each of the N motors comprises N sub-motors respectively ranked 1 to N in the N serial ducts, each $i^{th}$ sub-motor occupying a $i^{th}$ position in a serial duct; the sub-motors ranked one being feed sub-motors, the sub-motors ranked N being exhaust sub-motors.

With this additional feature, advantageously the circuit is symmetrical with respect to the different motors, and the average pressure in the different motors is substantially the same, whereby the wear of the motors is homogeneous and the risk of breakdown of the motors is reduced.

In one implementation, the hydraulic transmission circuit is adapted for allowing a group of P disynchronisable motors to be running at a speed different from that of the other motors. In that purpose, the circuit further comprises auxiliary ducts, each auxiliary duct joining the common feed duct or an outlet of a sub-motor of a disynchronisable motor, to the common exhaust duct or the inlet of a sub-motor of a disynchronisable motor, each auxiliary duct comprising an auxiliary valve; and with the auxiliary ducts, P sub-circuits are defined within the circuit, each of said sub-circuits:
a) being connected upstream to the common feed duct;
b) being connected downstream to the common exhaust duct;
c) passing from the inlet to the outlet through N sub-motors of disynchronisable motors;
each sub-motor of the disynchronisable motors being part of only one of said sub-circuits,
whereby, when said auxiliary valves are open, said sub-circuits are at least partially open allowing fluid to flow through said sub-circuits, so that the fluid flow through the disynchronisable motors is different from the fluid flow through the other motors, and said disynchronisable motors run at a different speed from the other motors.

Usually the sub-circuits are used as follows. In usual operation of the vehicle powered using the hydraulic transmission circuit, the motors receive fluid through the serial ducts, and the sub-circuits are closed.

Conversely, if a group of P motors have to be disynchronized to allow said P disynchronisable motors to run at a higher speed, an extra-flow of fluid flows through the P sub-circuits from the common feed duct towards the common exhaust duct.

The sub-circuits may comprise portions of the serial ducts. Therefore, if a part of the hydraulic transmission circuit is a serial duct and also belongs to a sub-circuit, the extraflow is added to the regular flow flowing through the serial duct.

If conversely the disynchronisable motors are disynchronised to run at a lower speed than the other motors, the extra flow flows in the reverse direction, i.e., from the common exhaust duct to the common feed duct. In that case, in portions of the serial ducts which also belong to sub-circuits, the extra flow is subtracted from the regular flow flowing through the serial ducts. In extreme cases the flow in such a part of a serial duct may thus flow towards the common feed duct, and not towards the common exhaust duct as in regular situations. (We suppose here that the transmission circuit is used in the positive, usual direction, wherein the fluid flows from the common feed duct to the common exhaust duct).

Lastly, the auxiliary ducts may often be fitted with a throttle, to limit the amount of fluid flowing through the sub-circuits, in order to limit the difference of speed between the motors of the circuit.

A frequent case is the case of a transmission circuit comprising two hydraulic motors. In this case, the two motors can be disynchronised according to the above-mentioned embodiment by a single auxiliary duct connecting the two serial lines required to couple and synchronise the two motors.

In one implementation, at least one auxiliary valve is integrated in a casing of a disynchronisable motor. In some cases (such as the above-mentioned circuits with only two motors) an or the auxiliary duct can further also be provided within the motor. This allows having disynchronisable motors without increasing the motors or the circuit size.

In one implementation, each of motors comprises a cylinder block and an internal fluid distributor with N distinct pairs of grooves, the cylinder block housing N groups of cylinders corresponding to the N sub-motors, the N groups of cylinders exchanging fluid through the N pairs of grooves of the fluid distributor. In a frequent embodiment of the invention, comprising only two motors, the motors are four-grooves motors, i.e., motors comprising fluid distributors with four peripheral grooves; two grooves being used for the inlet and outlet of a first sub-motor, two grooves being used for the inlet and outlet of the other sub-motor.

In one implementation, the hydraulic transmission circuit further comprises a valve device adapted for connecting the sub-motors of the N motors in parallel to the common feed duct and the common exhaust duct, while disconnecting the serial ducts. It may be indeed necessary to release the tight coupling between the motors, as defined by the invention, in order to have another type of driving for the motors in which the different motors may rotate at different speeds.

For instance, for field vehicles with four motion and two steering wheels, it is needed to have coupling between right and left wheels for usual straight on traveling. However, coupling release is necessary to allow wheels to turn at different speeds during tacking, since during tacking, the trajectory length of the interior wheels of an axle is less than an exterior's one. Exterior wheels then rotate at a higher speed than interior wheels.

In a circuit comprising such a valve device, the valve device may comprise two-position valves interposed on the serial ducts, each having three ports, i.e. a port on a first side connected to an inlet or an outlet of a sub-motor, a port on a second side connected to the common feed or the common exhaust of the system, the other port on the second side being connected to a serial duct.

Another objective on the invention is to define a vehicle, comprising a plurality of motor; and on which a plurality of motors can be almost tightly synchronized, to avoid any slip between the organ driven by the motors.

To meet this objective, the vehicle comprises
a hydraulic transmission circuit as previously defined;
detection means for detecting that the vehicle is in a curve, and
valve control means for controlling said auxiliary valves;
wherein said valve control means are adapted to open said auxiliary valve(s) when the detection means detect that the vehicle is in a curve.

Figure 2:
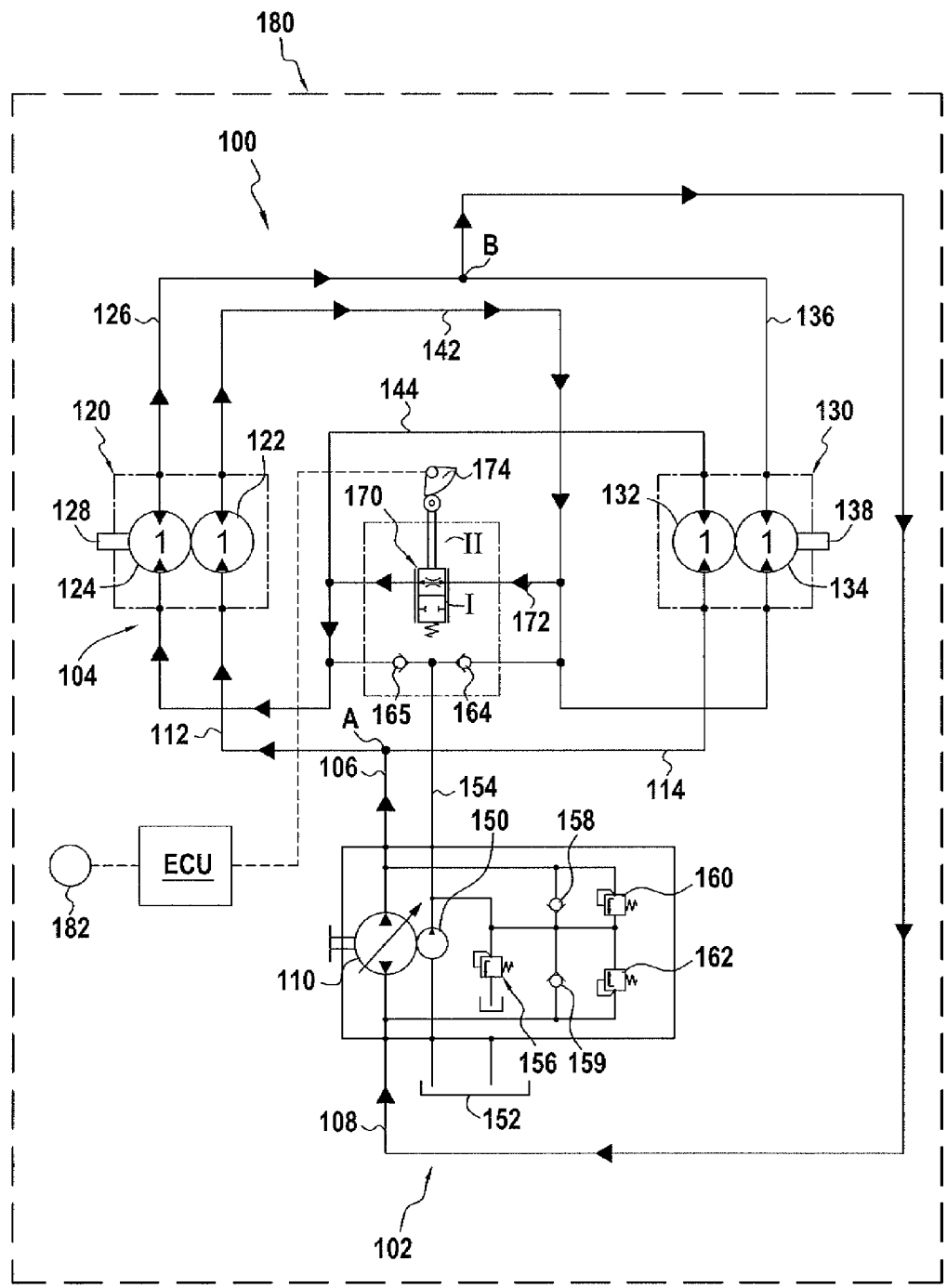
Figure 3:
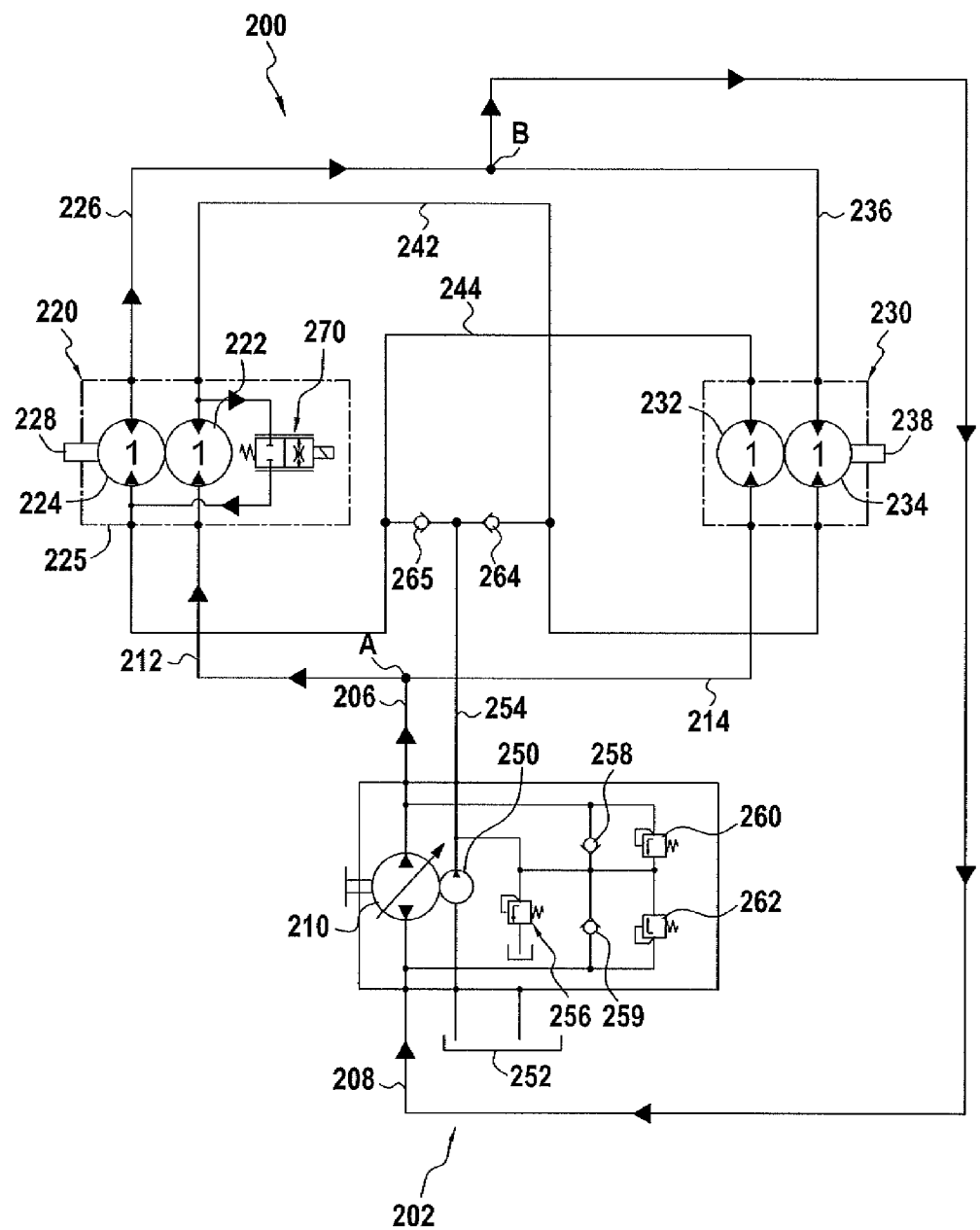
Figure 4:
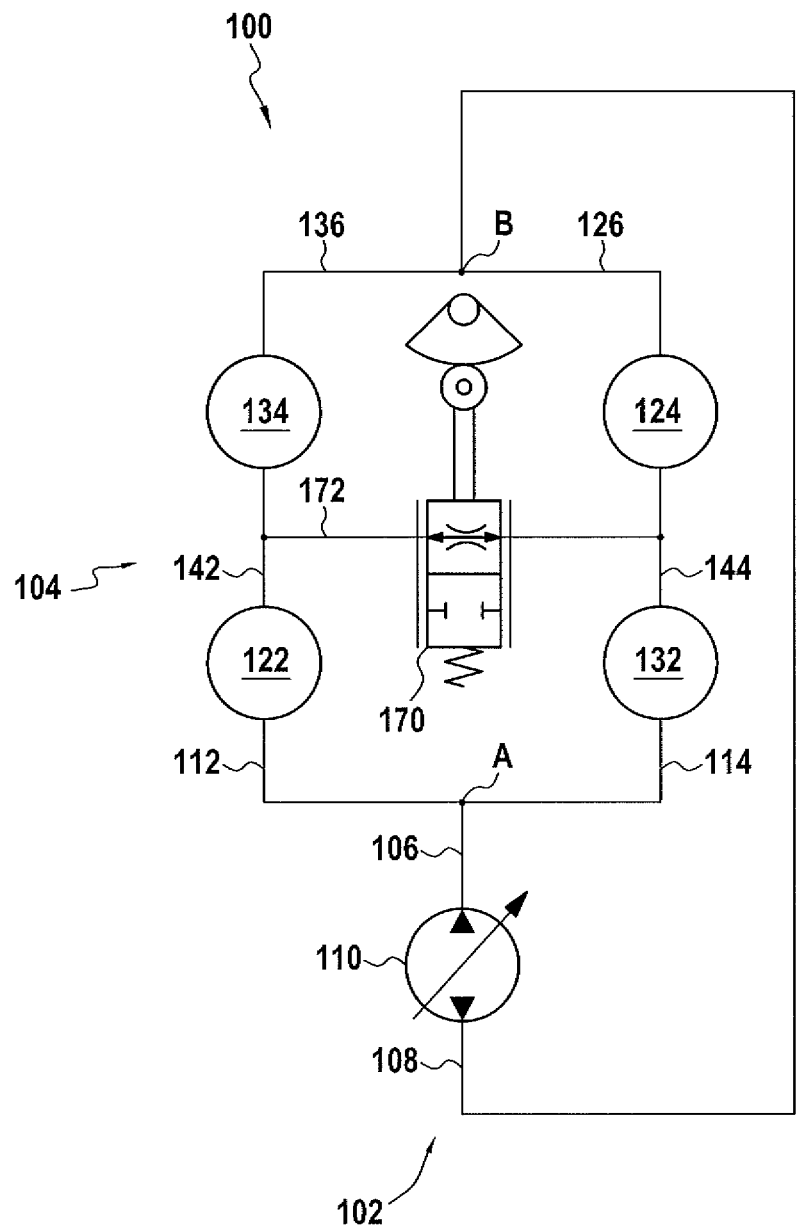
Figure 5A:
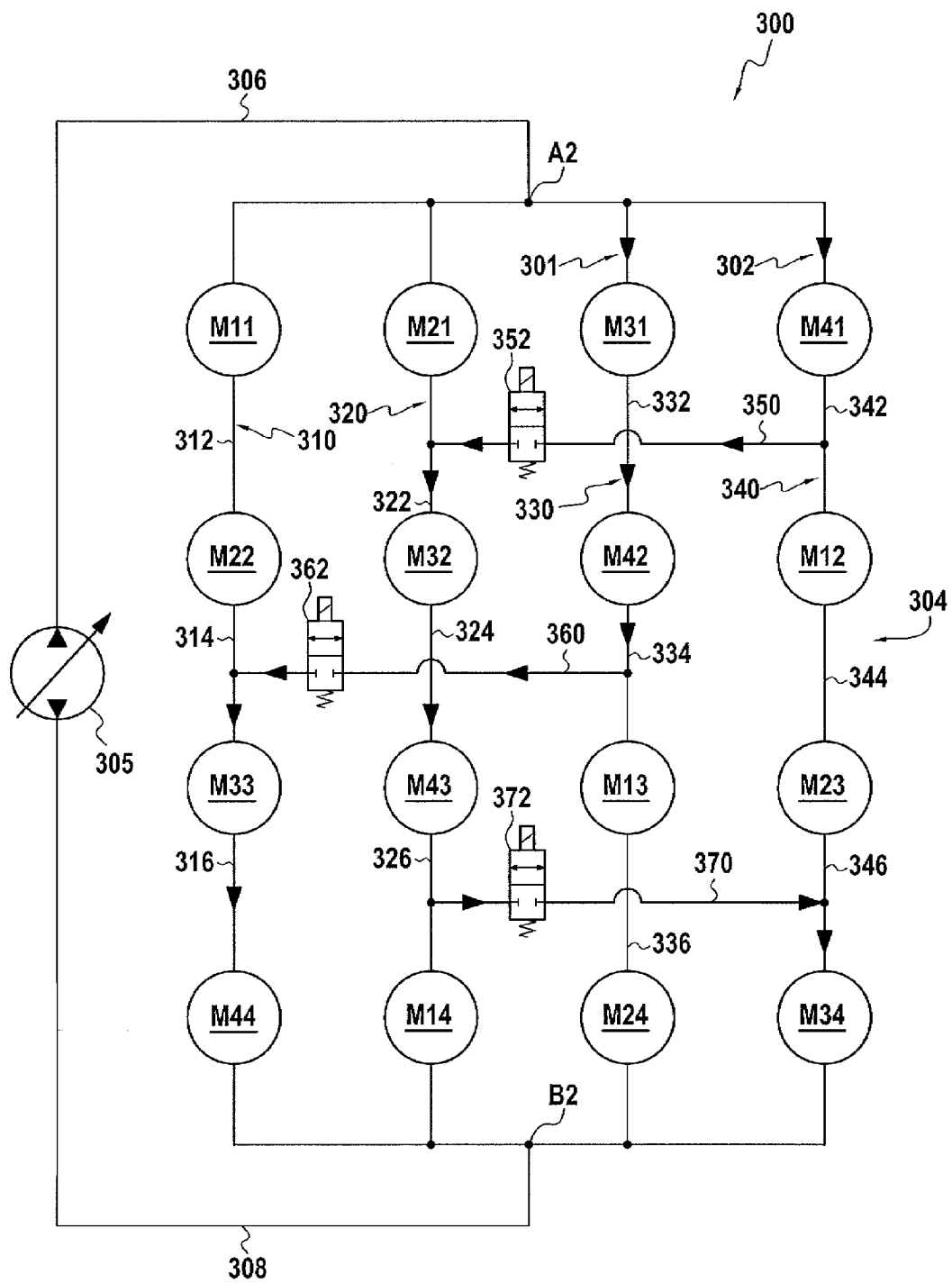
Figure 5B:
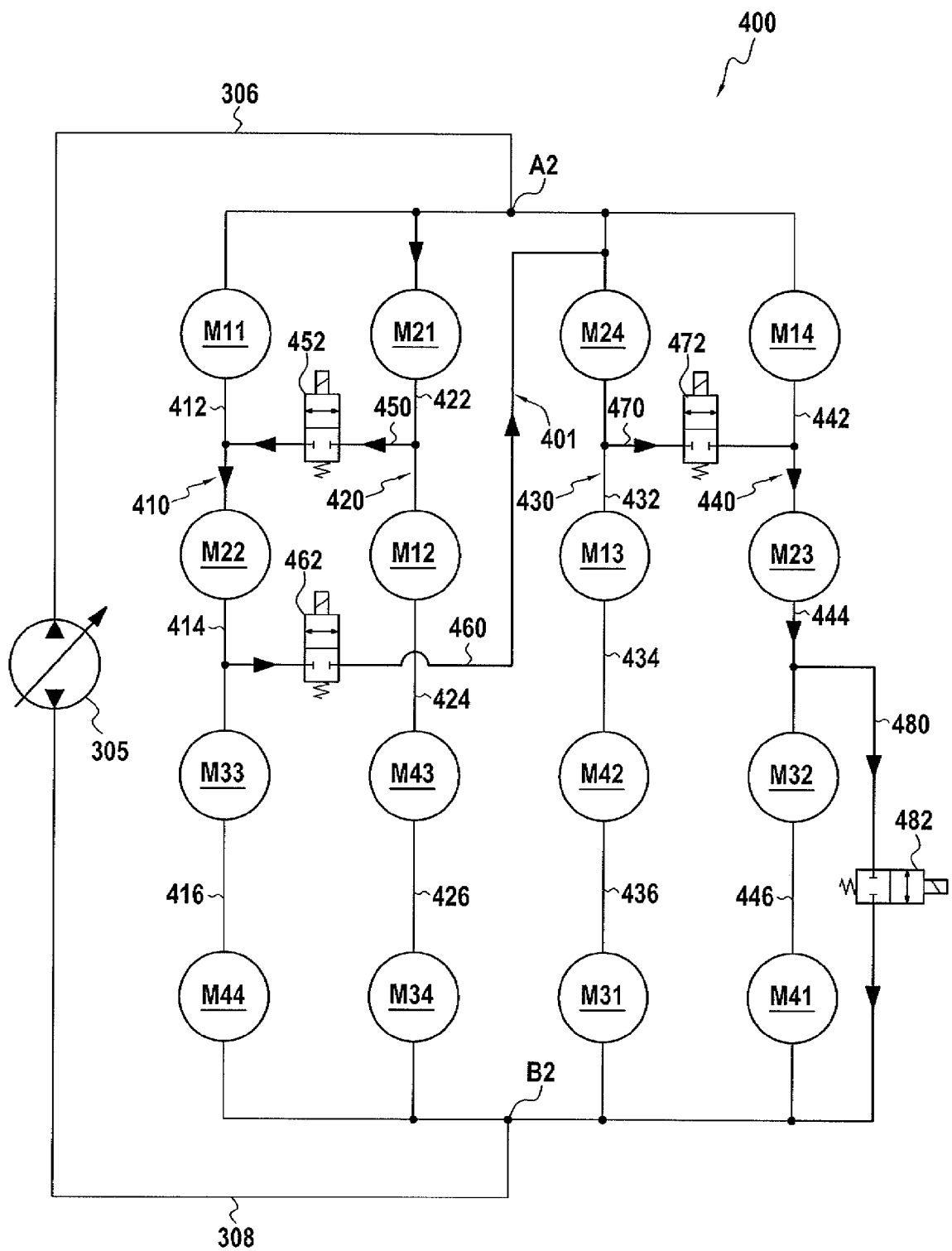
Figure 6:
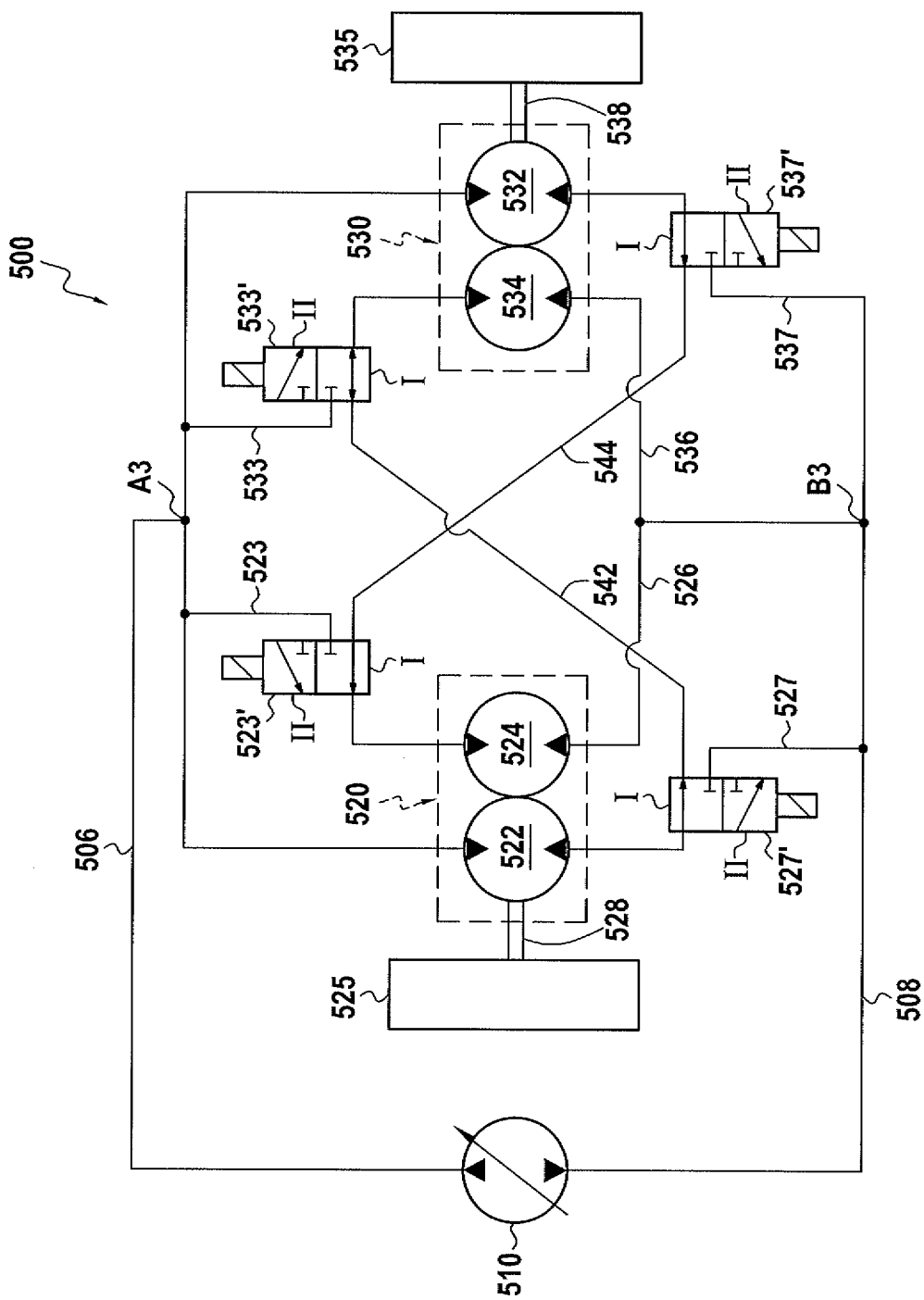
Figure 7:
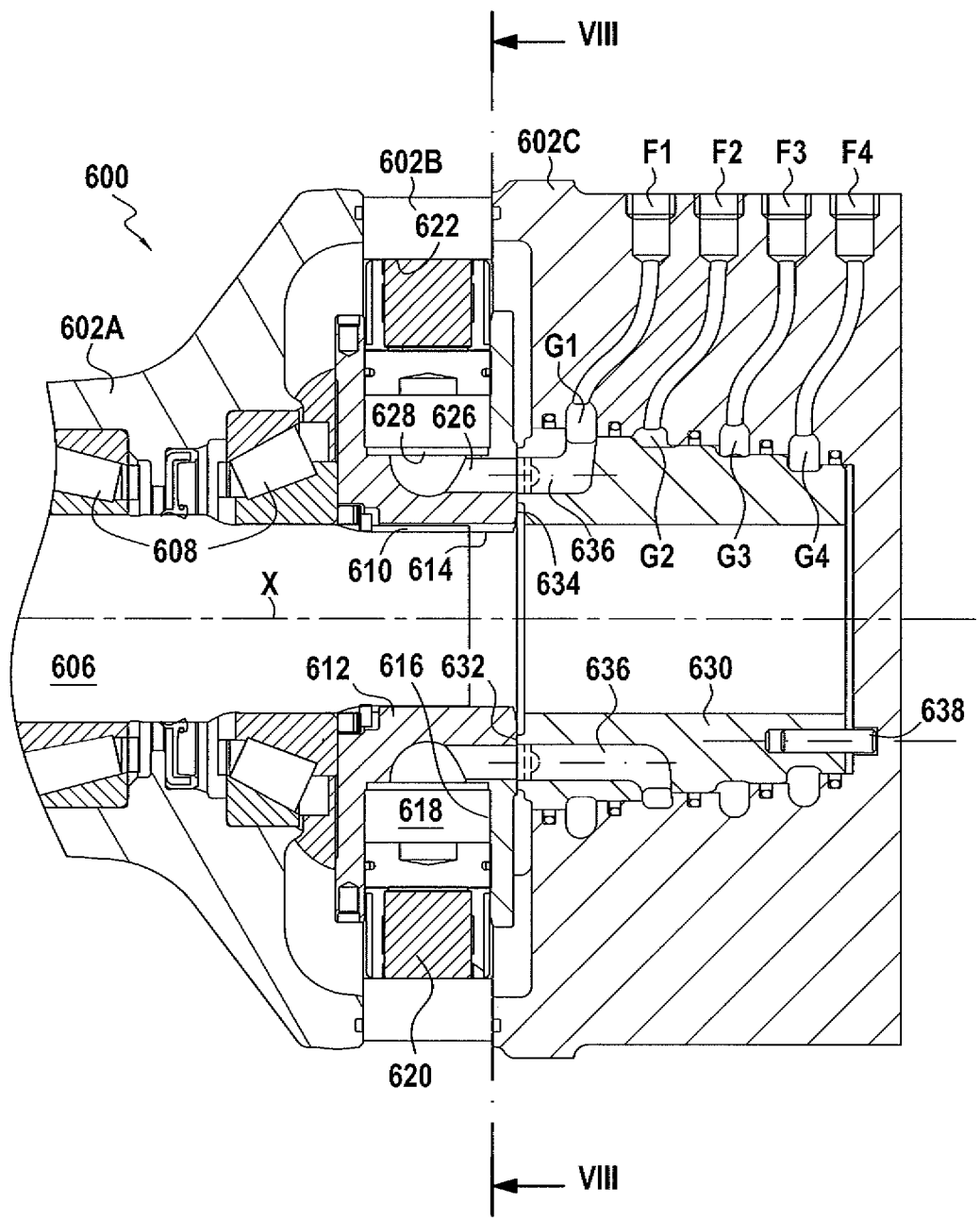
Figure 8:
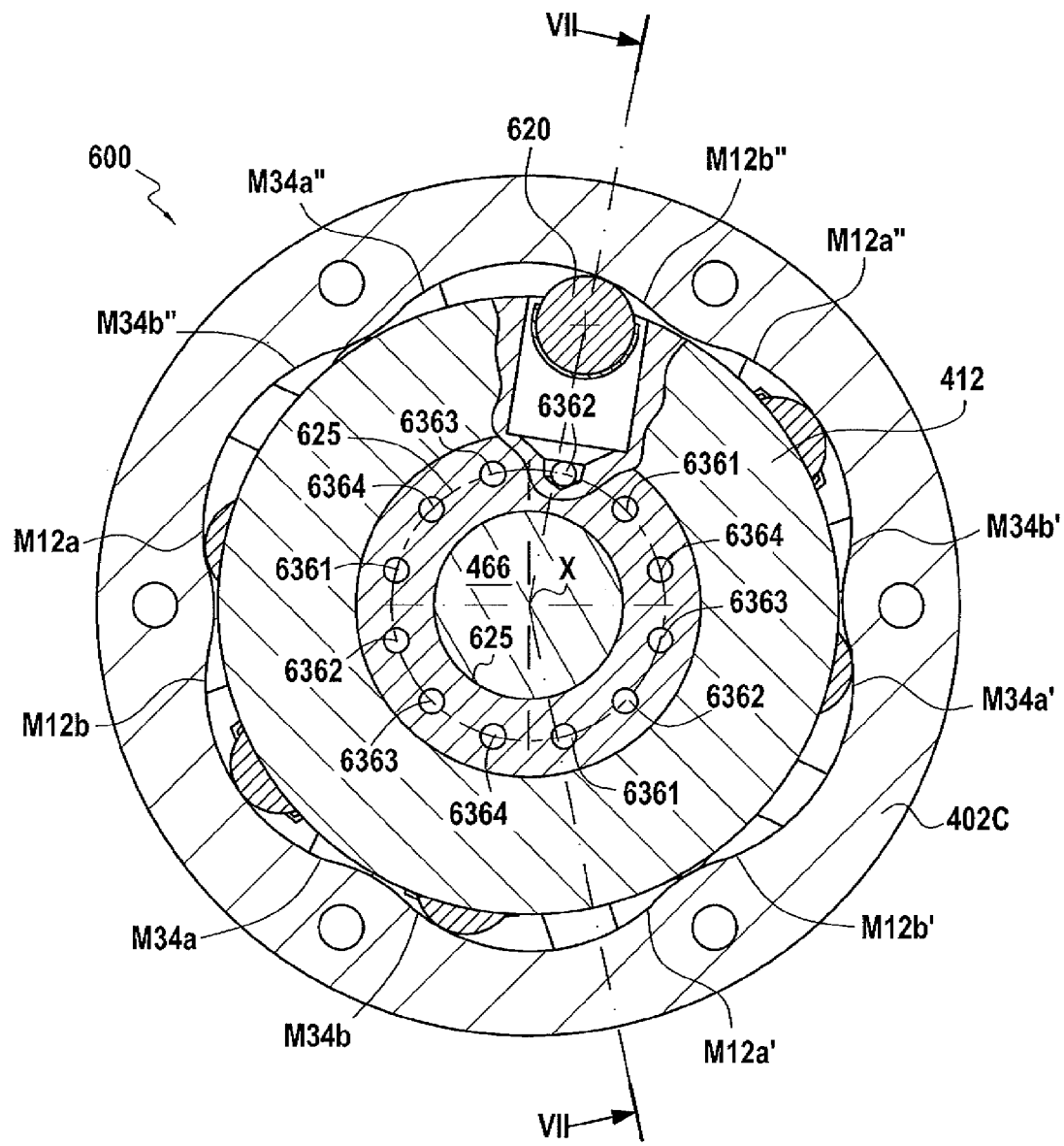

The invention is described in more details below with reference to the drawings, in which:
FIG. 1 is a schematic drawing of a hydraulic transmission circuit in a first embodiment of the invention;
FIG. 2 is a schematic drawing of a specific embodiment of the circuit shown on FIG. 1, the circuit being mounted on a vehicle, in a situation when the vehicle is in a curve;
FIG. 3 is a schematic drawing of a circuit similar to the circuit of FIG. 1, in a third embodiment of the invention;
FIG. 4 is a schematic drawing representing the circuit of FIG. 1, but using a different drawing convention;
FIGS. 5A and 5B are schematic drawings of circuits according to the invention, presented according to the above-mentioned drawing convention;
FIG. 6 is a schematic view of a circuit according to the invention,
FIGS. 7 and 8 are sections of a motor comprising two sub-motors, the motor being a main component in a circuit according to the invention, for example a circuit as represented on FIG. 1, 2, 3, 4 or 6.

FIG. 1 shows a hydraulic transmission circuit diagram of a first exemplary embodiment of the invention.

The hydraulic transmission circuit 100 comprises a pump portion 102 and a drive portion 104.

The pump portion comprises two main lines, a common feed duct 106 and a common exhaust duct 108, respectively connected at the main ports of a pump 110.

From the upstream to the downstream parts, the drive portion 104 is laid out as follows:
On a branch point A, the common feed duct 106 splits in two feed sub-ducts 112 and 114. Each of these sub-ducts feeds a feed sub-motor, respectively 122 and 132, of two motors 120 and 130 of circuit 100.

The outlets of sub-motors 122 and 132 are each connected via two serial ducts 142, 144 to the inlets respectively of two exhaust sub-motors 134, 124 of motors 130, 120.

The outlets of these exhaust sub-motors 134, 124 are connected via exhaust sub-ducts 126, 136 to a junction point B, where the exhaust sub-ducts 126, 136 are connected to the common exhaust duct 108.

Each of motors 120, 130 comprises an output shaft 128, 138, which drives a not-shown rotative organ of an vehicle on which circuit 100 is set up. Typically, the output shafts 128, 138 drive wheels of the vehicle. The hydraulic motors 120, 130 do not necessarily have to drive opposite vehicle wheels of a common vehicle axle. These motors 120, 130 may also be used for example to drive two tracks of a tracked vehicle. They can also drive two wheels on one side of a vehicle, said wheels being mounted on two different axles.

All four sub-motors 122, 124, 132, 134 have the same displacement capacity; all four sub-motors have one inlet port and one outlet port, to receive and reject hydraulic fluid.

To feed hydraulic fluid into circuit 100, use is made of a feed pump 150 which is coupled to the pump 110, and which draws pressure fluid from a tank 152 and feeds it into a feed line 154. To limit the pressure into feed line 154, a pressure-limiting valve 156 is provided which connects the feed line 154 to a tank 152.

The feed line 154 is connected via a first nonreturn valve 158 to the common feed duct 106 and via a second nonreturn valve 159 to the common exhaust duct 108. The pressure fluid is thus fed in each case into that respective common duct 106 or 108 which is carrying low pressure at the time. Arranged parallel to the nonreturn valves 158 and 159 are pressure-limiting valves 160 and 162 in order to limit the pressure in the respective common ducts 106 or 108 carrying high pressure at the time.

The first serial duct 142 is connected via a third nonreturn valve 164 to the feed line 154, whereas the second serial duct 144 is connected via a fourth nonreturn valve 165 to the feed line 154. As a result, hydraulic fluid is fed into the respective serial ducts 142 or 144, carrying low pressure at the time, of circuit 100.

The hydrostatic circuit 100 according to the invention works as follows:

The pump 110 pumps working fluid via the common feed duct into feed sub-motors 122, 132 of motors 120, 130. At junction point A, the flow is split in two equal sub-flows, shown by the arrows on FIG. 1. These sub-flows flow through respectively the two feed sub-motors 122, 132; then through the exhaust sub-motors 124, 134; the fluid is then collected at junction point B and returns to the pump 110 via the common exhaust duct 108.

A situation where one of motors 120, 130 would rotate faster than the other motor, is not possible due to the intertwined structure of the drive portion 104 of circuit 100. Indeed, any increase of throughput through a sub-motor is accompanied by the same increase in a sub-motor the other sub-motor, because of the two serial ducts connecting said sub-motors of the vehicle.

The circuit shown on FIG. 1 is further particularly stable as each of the motors 120, 130, comprises a sub-motor ranked 1, i.e. a feed sub-motor; and a sub-motor ranked 2, i.e. an exhaust sub-motor. Accordingly, none of the motors can be considered being leading with respect to the other motor. They have symmetrical positions in the circuit 100, and the pressures in respective serial ducts 142 and 144 is usually equal.

The circuit 100 is further set up so that the two motors can rotate at different speeds. In that purpose, circuit 100 further comprises an auxiliary valve 170 provided on an auxiliary duct 172 connecting the first and the second serial ducts 142, 144.

The auxiliary valve 170 is a progressive two-position valve, controlled by an actuator 174. The position or, more precisely the rotation of the actuator 174 is controlled in relation with or by the rotation of a not-shown driving wheel of the vehicle on which circuit 100 is set up.

The auxiliary valve 170 has a first position, shown on FIG. 1, in which it separates the two serial lines; and a second position II, on which it connects the two serial ducts via a throttle.

The effects of the auxiliary duct 172 and the auxiliary valve 170 are better explained on FIG. 2, which shows how a group of motors (here, motor 130) can be disynchronized from the other motor 120. This figure shows an extreme case in which motor 130 would be stopped. In the case when the motors 120 and 130 drive wheels of an vehicle, this could happen when the vehicle is in a curve, and the interior wheel is stopped to allow the vehicle to turn with a small curvature radius.

This is done by opening the auxiliary valve 170 in circuit 100. At junction point A, the fluid flows toward the feed sub-motor 122. The fluid exiting sub-motor 122 flows through an upstream portion of the serial duct 142, but instead of flowing through sub-motor 134, is directed to the other serial duct 144 via the auxiliary duct 172, and thus to the inlet of sub-motor 124. From this sub-motor 124, it returns to the pump 110.

Of course, intermediate states are also possible, in which a part of the fluid keeps flowing through motor 130, allowing a slow rotation thereof.

As shown on FIG. 2, the circuit 100 is set up on a vehicle 180. This vehicle comprises a sensor 182, acting as detection means, for detecting that the vehicle is in a curve.

The vehicle 180 also comprises an electronic control unit ECU, as valve control means, which controls the auxiliary valve 170 through the actuator 174. The electronic control unit ECU is adapted to open the valve 170 when the sensor 182 detect that the vehicle 180 is in a curve.

FIG. 3 presents another embodiment of a hydraulic transmission circuit according to the invention.

The circuit 200 presented on FIG. 3 is very similar to circuit 100 of FIGS. 1 and 2; for this reason, only the elements of circuit 200 which are different from those of circuit 100 will be presented. The elements of circuit 200 which are present in circuit 100 bear the same reference signs, incremented of 100.

The differences between circuits 100 and 200 relate to how motors 120 and 130 are allowed to be disynchronized.

Indeed, in circuit 200, the auxiliary valve 270 is integrated in a casing of a disynchronisable motor, in this case, in the casing 225 of the motor 220. As shown on FIG. 2, it allows providing the disynchronization function very simply, merely by adding a two-position valve in one of the motors. Valve 270 is controlled by not-shown valve control means, similar to the valve control means presented in relation with FIG. 2.

The arrows on FIG. 3 illustrate the same circuit configuration as on FIG. 2, i.e. when motor 230 is stopped, and all the fluid is directed to motor 220 to power it.

FIG. 4 introduces a new way for representing a hydraulic transmission circuit. The circuit illustrated on FIG. 4 is the circuit 100 already introduced in relation with FIG. 1.

For sake of clarity, some safety or secondary elements have not been shown on FIG. 4, although they of course still belong to circuit 100. Moreover, contrary to conventional practice, sub-motors of one motor have not been represented close one to another, but separated. This is to allow a simplified representation of the fluid flows through circuit 100.

On FIG. 4, it is possible especially to identify a grid structure of the drive portion 104 of circuit 100. Indeed, from bottom to top, circuit 100 comprises a first fork on junction point A, where sub-feed ducts 112,114 branch on the common feed duct 106. The two serial ducts 142, 144 carry over the fluid from the feed sub-motors 122, 132 to the exhaust sub-motors 124, 134. The exhaust sub-ducts 126, 136 collect the fluid and carry it to junction point B, from where it flows back to pump 110 via the common exhaust duct 108.

This representation now allows introducing and presenting more simply another embodiment of the invention, i.e. a hydraulic transmission circuit 300 comprising four motors M1, M2, M3, M4, shown on FIG. 5A. In accordance with this representation, motors M1-M4 are not individually shown on the figure but appear through their respective sub-motors Mij, where i is the reference number of the motor (M1-M4), and j the reference number of the sub-motor (1-4).

Circuit 300 comprises a pump 305, connected via a common feed duct 306 and a common exhaust duct 308 to a drive portion 304 of circuit 300.

The feed common duct 306 drives the fluid to an upstream junction point A2, on which the inlet of one sub-motor of each of the four motors M1-M4 is connected, namely sub-motors M11, M21, M31, M41.

The circuit 300 further comprises 4 serial ducts 310, 320, 330, 340. Each of them connects a feed sub-motor (one of M11, M21, M31, M41), to an exhaust sub-motors, namely sub-motors M44, M14, M24, M34.

With more details, serial duct 310 comprises three serial lines 312, 314, 316, to connect successively sub-motors M11, M22, M33 and M44.

Serial duct 320 comprises three serial lines 322, 324, 326, to connect successively sub-motors M21, M32, M43 and M14.

Serial duct 330 comprises three serial lines 332, 334, 336, to connect successively sub-motors M31, M42, M13 and M24.

Serial duct 340 comprises three serial lines 342, 344, 346, to connect successively sub-motors M41, M12, M23 and M34.

The exhaust sub-motors M14, M24, M34, M44 are connected to an exhaust junction point B2, from where fluid is returned to the pump 305 via the common exhaust duct 308.

Thanks to the serial ducts 310, 320, 330, 340, the four motors M1-M4 are synchronized and no slip is tolerated between them.

Circuit 300 is further set out so that motors M1,M2 can be disynchronized from motors M3,M4. For that purpose, circuit 300 further comprises three auxiliary ducts 350, 360, 370.

Each auxiliary duct joins the common feed duct or an outlet of a sub-motor of a disynchronisable motor, to the common exhaust duct or the inlet of a sub-motor of a disynchronisable motor. In the case of circuit 300, the auxiliary ducts 350, 360 and 370 respectively connect, the outlet of sub-motor M41 to the inlet of sub-motor M32;
the outlet of sub-motor M42 to the inlet of sub-motor M33;
the outlet of sub-motor M43 to the inlet of sub-motor M34.

Each of auxiliary ducts 350, 360 and 370 comprises an auxiliary valve (respectively valves 352, 362, 372). These valves are well known two-position electro-valves which are closed in their normal rest position.

Thanks to the auxiliary ducts 350, 360 and 370, it is possible to identify two sub-circuits 301 302 in circuit 300:

sub-circuit 301 extends from the common feed duct, via sub-motors M31, M42, M33, M44 to the common exhaust duct;

sub-circuit 302 extends from the common feed duct, via sub-motors M41, M32, M43, M34 to the common exhaust duct.

These sub-circuits are used when motors M3 and M4 have to rotate for example at a higher speed than motors M1 and M2. Under such circumstances, in addition to a normal flow of fluid flowing through the serial ducts, an additional flow may flow through sub-circuits 301, 302 via open valves 352, 362, 372 and through the auxiliary ducts 350,360,370.

As the resulting flow flowing through motors M3 and M4 is larger than the flow through motors M1 and M2, it enables a faster speed of motors M3 and M4.

It should be noted that by having the fluid flowing through the auxiliary ducts in the inverse direction as that shown by arrows on FIG. 5A, it allows conversely motors M1 and M2 to rotate at a higher speed than motors M3-M4.

FIG. 5B shows another embodiment of a hydraulic transmission circuit according to the invention. The circuit 400 shown on FIG. 5B is largely similar to FIG. 5A. For this reason, only the elements of circuit 400 which are different from those of circuit 300 will be presented. The elements which are common to circuits 300 and 400 bear the same reference signs.

A first, major difference between circuits 300 and 400 relates to how the sub-motors are connected. In circuit 400, the feed common duct 306 drives the fluid to an upstream junction point A2, on which the inlet of four sub-motors of the motors M1-M2 are connected, namely sub-motors M11, M21, M24, M14. No sub-motor of motors M3, M4 is a feed sub-motor.

The circuit 400 further comprises 4 serial ducts 410, 420, 430, 440. Each of them connects a feed sub-motor (one of M11, M21, M24, M14), to an exhaust sub-motors, namely sub-motors M44, M34, M31, M41.

With more details, serial duct 410 comprises three serial lines 412, 414, 416, to connect successively sub-motors M11, M22, M33 and M44.

Serial duct 420 comprises three serial lines 422, 424, 426, to connect successively sub-motors M21, M12, M43 and M34.

Serial duct 430 comprises three serial lines 432, 434, 436, to connect successively sub-motors M24, M13, M42 and M31.

Serial duct 440 comprises three serial lines 442, 444, 446, to connect successively sub-motors M14, M23, M32 and M41.

The exhaust sub-motors M44, M34, M31, M41 are connected to an exhaust junction point B2, from where fluid is returned to the pump 305 via the common exhaust duct 308.

A characteristic of this circuit 400 is that in the serial ducts, the sub-motors of motors 1, 2 are ranked 1 and 2, that is, they are sub-motors appearing on position 1 or 2 on the list of the sub-motors crossed by the serial ducts, i.e., feed sub-motors (rank 1), or sub-motors directly connected to the outlet of a feed-sub-motor (rank 2). Conversely, sub-motors of motors 3 and 4 are only sub-motors of rank 3 or 4, that is, sub-motors appearing on position 3 or 4 on the list of the sub-motors crossed by the serial ducts. This allows operating motors 1 and 2 at a higher fluid pressure than motors 3 and 4, if this is wished.

Conversely, in the circuit presented on FIG. 5A, each of motors M1-M4 comprises one sub-motor of rank 1, one sub-motor of rank 2, one sub-motor of rank 3, one sub-motor of rank 4.

A second major difference between circuits 300 and 400 relates to how the motors can be disynchronized with respect one to another. Circuit 400 is laid out so that motor M2 can be disynchronized. In this purpose, the circuit 400 comprises four auxiliary ducts 450, 460, 470, 480.

Each of auxiliary ducts 450, 460, 470, 480 comprises an auxiliary valve (respectively valves 452, 462, 472, 482). These valves are well known two-position electro-valves which are closed in their normal rest position.

Thanks to the auxiliary ducts 450, 460, 470, and 480, it is possible to identify one sub-circuit 401 in circuit 400, extending from the common feed duct, via sub-motors M21, M22, M24, M23 to the common exhaust duct. It will be noted that all sub-motors of motor 2 belong to sub-circuit 401; all sub-motors of motor M2 are flown through from the inlet to the outlet of the sub-circuit 401 (the respective locations of the inlet and outlet of the sub-motors are defined by the serial ducts).

The sub-circuit 401 allows an extra-flow of fluid to flow through motor M2 in addition to flows of fluid crossing motors M1-M4; accordingly, it allows motor M2 to rotate at a higher speed than the other motors, or a lower speed if the extra-flow of fluid flows through the sub-motors of motor M2 in a direction opposed to that shown on the FIG. 5B.

FIG. 6 shows another embodiment of a hydraulic circuit according to the invention. This circuit 500 comprises two motors 520, 530. Each of these motors 520, 530 comprises two sub-motors 522, 524 and 532, 534 respectively. For sake of clarity, all safety or secondary elements have not been shown on FIG. 6, although they of course are provided in circuit 500.

In each of the motors 520, 530, the sub-motors are coupled to an output shaft (respectively 528 and 538) of the motor; these output shafts drive two wheels 525 and 535, of a not-shown vehicle on which the circuit is set up.

The motors are powered by a pump 510, which delivers fluid under high pressure through a common feed duct 506; the exhaust fluid returns to the pump 510 through a common exhaust duct 508. As in the circuit of FIG. 1, fluid is fed from a junction point A3 at an end of the common feed duct, to the submotors 522 and 532 of motors 520 and 530. Two serials ducts 542 and 544 are provided, through which the fluid flows respectively from the outlet of sub-motor 522 to the inlet of sub-motor 534, and from the outlet of sub-motor 532 to the inlet of sub-motor 524. The outlets of submotors 524 and 534 are collected respectively via exhaust ducts 526 and 536 and returned to the pump via a junction point B3 and the common exhaust duct 508.

Circuit 500 further comprises four secondary ducts 523, 527, 533, 537. Each of ducts 523, 527, 533, 537 is further connected to a two-position selection valve: valves 523', 533' having two inlet ports and one outlet port; valves 527' and 537' having one inlet port and two outlet ports.

The first inlet port of valves 523' and 533' is connected respectively to the first outlet port of valves 537' and 527'.

Through ducts 523 and 533, a second inlet port of valves 523' and 533' is connected to the common feed duct 506. The outlet port of these valves is connected respectively with the inlet of sub-motors 524 and 534.

Similarly, through ducts 527 and 537, a second outlet port of valves 527' and 537' is connected to the common exhaust duct 508. The inlet port of these valves is connected respectively with the outlet of sub-motors 522 and 532.

In a first position (position I), the first inlet of valves 523', 533' is connected with the outlet thereof, whereas in the second position (position II), the second inlet of valves 523', 533' is connected with the outlet thereof.

In a first position (position I), the inlet of valves 527', 537' is connected with the first outlet thereof, whereas in the second position (position II), the inlet of valves 523', 533' is connected with the second outlet thereof.

Accordingly, in the first position of valves 523', 527', 533', 537', the serial ducts 542 and 544 are established as previously mentioned, enabling the synchronization of motors 520 and 530.

Conversely, when all valves 523', 527', 533', 537' are in the second position, no fluid can flow through auxiliary ducts 542, 544. All sub-motors receive fluid directly from the common feed duct 506, and return it directly to the pump via the common exhaust duct 508. In this configuration, the motors 520,530, and even the sub-motors thereof, can rotate at different speeds.

With reference to FIGS. 7 and 8, a hydraulic motor 600 adapted for implementing the invention in the case of a hydraulic circuit with two motors, each motor having two sub-motors, will now be presented.

Hydraulic motor 600 comprises:

a housing 602 in three parts 602A, 602B, 602C, assembled together by not-shown screws;

an output shaft 606, rotatably mounted on an axis X with respect to housing 602, thanks to bearings 608; said output shaft 606 bearing splines 610 provided on the end thereof located inside housing 602;

a cylinder-bloc 612, having internal splines 614 which engage splines 610 of the output shaft 606, to couple the rotations of these two parts; said cylinder-bloc 612 being contained inside housing 602 and comprising eight radial cylinders 616, laid out at regular angular spaces;

pistons 618, slidably mounted inside said cylinders 616, one per cylinder, each being adapted, in association with a shoe 620, to exert a pressure on the internal surface of a part 602B of the housing, formed as a cam surface 622 with six lobes;

an internal fluid distributor 630, having a planar surface 632, contacting a planar surface 634 of the cylinder-bloc 612, both surfaces being perpendicular to axis X; said fluid distributor 630 being coupled in rotation with housing part 602C by pins 638, and thus with the cam surface 622, and comprising furthermore on its outer surface four grooves G1, G2, G3, G4, coaxial with axis X;

cylinder ducts 626, one per cylinder, connecting the chambers 628 of the cylinders 616 to openings formed in the planar surface 634 of the cylinder-bloc; said openings being angularly regularly spaced around axis X, and centered on a circle 625 centered on axis X;

distribution ducts 636 provided in fluid distributor 630, connecting openings formed in said planar surface 632 and also angularly regularly spaced around axis X, and centered on the same circle 625, to said grooves G1-G4; one said distribution duct being provided for each ascending or respectively descending lobe of the cam surface 622; so that during the rotation of the cylinder-bloc with respect to housing part 602C, each of the cylinder ducts 626 communicates with distribution ducts 636 successively connected to grooves G1-G2-G3-G4, then G1-G2-G3-G4, etc. (or the other way round, depending on the way the motor rotates);

four main ducts of the motor F1, F2, F3, F4; each main duct connecting an opening on the outer face of housing part 602C, to respectively one of grooves G1-G4.

These latter openings are provided to be connected respectively as the inlets and outlets of two sub-motors of motor 600, which will now be described. The functioning of motor 600 can be better understood in relation with FIG. 8. FIG. 8 is a sectional view of motor 8 through cylinder-bloc 612.

Because of the layout of the fluid distributor 630, and especially of the distribution ducts 636 successively connected to grooves G1-G2-G3-G4 as mentioned above, the motor 600 works as a motor with two sub-motors 600A and 600B.

Sub-motors 600A and 600B are independent as they have separate fluid inlet and outlet. Therefore, they can be separately controlled to provide distinct contributions to the torque applied on the output shaft 606.

Indeed, the cam surface 622 is made of twelve elementary portions: twelve ascending or descending half-lobes, respectively in the following order: M12a, M12b, M34a, M34b, M12a', M12b', M34a', M34b', M12a", M12b", M34a", M34b", in which lobes M12xx are part of the first sub-motor, and are connected to grooves 1 and 2; lobes M34xx are part of the second sub-motor, and are connected to grooves 3 and 4. Half-lobes whose name comprises 'a' are ascending semi-lobes, while half-lobes whose name comprises 'b' are descending semi-lobes. On FIG. 8, the distribution ducts are named after the groove with which they are connected: Ducts 4361 are connected with groove 1; ducts 4362 with groove 2, etc.

The invention claimed is:

1. Hydraulic transmission circuit with a first number of hydraulic motors, said first number being an integer superior or equal to 2, wherein
    each motor comprises sub-motors, the number of said sub-motors being equal to said first number of motors, all said sub-motors having the same cylinder displacement;
    the circuit comprises one common feed duct adapted for receiving fluid under pressure, and to which one feed sub-motor of each motor is connected;
    one common exhaust duct, adapted for ejecting exhaust fluid, and to which one exhaust sub-motor of each motor is connected;
    serial ducts, the number of said serial ducts being equal to said first number of motors, each serial duct connecting a feed, first sub-motor to an exhaust sub-motor via said first number minus two interposed sub-motors, said connected sub-motors respectively belonging to said.

2. Hydraulic transmission circuit according to claim 1, wherein each of said motors comprises sub-motors respectively ranked from one to said first number in said serial ducts, each so-ranked sub-motor-occupying a position of the same rank in a serial duct; the sub-motors ranked one being feed sub-motors, the sub-motors ranked at said first number being exhaust sub-motors.

3. Hydraulic transmission circuit according to claim 1, adapted for allowing a group of a second number of disynchronisable motors to be running at a speed different from that of the other motors; the circuit further comprising auxiliary ducts; each auxiliary duct joining the common feed duct or an outlet of a sub-motor of a disynchronisable motor, to the common exhaust duct or the inlet of a sub-motor of a disynchronisable motor; each auxiliary duct comprising an auxiliary valve; and with the auxiliary ducts, sub-circuits are defined within the circuit, the number of said sub-circuits being equal to said second number of disynchronisable motors, each of said sub-circuits:
    a) being connected upstream to the common feed duct;
    b) being connected downstream to the common exhaust duct;
    c) passing from the inlet to the outlet through said first number of sub-motors of disynchronisable motors;
    each sub-motor of the disynchronisable motors being part of only one of said sub-circuits,
    whereby, when said auxiliary valves are open, said sub-circuits are at least partially open allowing fluid to flow through said sub-circuits, so that the fluid flow through the disynchronisable motors is different from the fluid flow through the other motors, and said disynchronisable motors run at a different speed from the other motors.

4. Hydraulic transmission circuit according to claim 2, adapted for allowing a group of a second number of disynchronisable motors to be running at a speed different from that of the other motors; the circuit further comprising auxiliary ducts; each auxiliary duct joining the common feed duct or an outlet of a sub-motor of a disynchronisable motor, to the common exhaust duct or the inlet of a sub-motor of a disynchronisable motor; each auxiliary duct comprising an auxiliary valve; and with the auxiliary ducts, sub-circuits are defined within the circuit, the number of said sub-circuits being equal to said second number of disynchronisable motors, each of said sub-circuits:
    a) being connected upstream to the common feed duct;
    b) being connected downstream to the common exhaust duct;
    c) passing from the inlet to the outlet through said first number of sub-motors of disynchronisable motors;
    each sub-motor of the disynchronisable motors being part of only one of said sub-circuits,
    whereby, when said auxiliary valves are open, said sub-circuits are at least partially open allowing fluid to flow through said sub-circuits,
    so that the fluid flow through the disynchronisable motors is different from the fluid flow through the other motors, and said disynchronisable motors run at a different speed from the other motors.

5. Hydraulic transmission circuit according to claim 3, wherein at least one auxiliary valve is integrated in a casing of a disynchronisable motor.

6. Hydraulic transmission circuit according to claim 1, wherein each of the motors comprises a cylinder block and an internal fluid distributor with distinct pairs of grooves, the number of said distinct pairs of grooves being equal so said first number of motors, the cylinder block housing pH groups of cylinders corresponding to the sub-motors, the number of said groups of cylinders and the number of said corresponding sub-motors being both equal to said first number of motors, said groups of cylinders exchanging fluid through said pairs of grooves of the fluid distributor.

7. Hydraulic transmission circuit according to claim 1, further comprising a valve device adapted for connecting the sub-motors of said motors in parallel to the common feed duct and the common exhaust duct, while disconnecting the serial ducts.

8. Hydraulic transmission circuit according to claim 7, wherein said valve device comprises two-position valves interposed on the serial ducts, each having three ports, i.e. a port on a first side connected to an inlet or an outlet of a sub-motor, a port on a second side connected to the common feed or the common exhaust of the system, the other port on the second side being connected to a serial duct.

9. Vehicle, comprising
    a hydraulic transmission circuit with a first number of hydraulic motors, said first number being an integer superior or equal to 2, wherein
    each motor comprises sub-motors, the number of said sub-motors being equal to said first number of motors, all said sub-motors having the same cylinder displacement;

the circuit comprises one common feed duct adapted for receiving fluid under pressure, and to which one feed sub-motor of each motor is connected;

one common exhaust duct, adapted for ejecting exhaust fluid, and to which one exhaust sub-motor of each motor is connected;

serial ducts, the number of said serial ducts being equal to said first number of motors, each serial duct connecting a feed, first sub-motor to an exhaust sub-motor via said first number minus two interposed sub-motors, said connected sub-motors respectively belonging to said motors;

the circuit further comprising auxiliary ducts; each auxiliary duct joining the common feed duct or an outlet of a sub-motor of a disynchronisable motor, to the common exhaust duct or the inlet of a sub-motor of a disynchronisable motor; each auxiliary duct comprising an auxiliary valve; and with the auxiliary ducts, sub-circuits are defined within the circuit, the number of said sub-circuits being equal to said second number of disynchronisable motors, each of said sub-circuits:

a) being connected upstream to the common feed duct;

b) being connected downstream to the common exhaust duct;

c) passing from the inlet to the outlet through said first number of sub-motors of disynchronisable motors;

each sub-motor of the disynchronisable motors being part of only one of said sub-circuits, said vehicle further comprising
  detection means for detecting that the vehicle is in a curve, and
  valve control means (ECU) for controlling said auxiliary valves;

wherein said valve control means are adapted to open said auxiliary valve(s) when the detection means detect that the vehicle is in a curve, whereby, when said auxiliary valves are open, said sub-circuits are at least partially open allowing fluid to flow through said sub-circuits, so that the fluid flow through the disynchronisable motors is different from the fluid flow through the other motors, and said disynchronisable motors run at a different speed from the other motors.

10. Vehicle according to claim 9, wherein each of said motors comprises sub-motors respectively ranked from one to said first number in said serial ducts, each so-ranked sub-motor occupying a position of the same rank in a serial duct; the sub-motors ranked one being feed sub-motors, the sub-motors ranked at said first number being exhaust sub-motors.

11. Vehicle according to claim 9, wherein at least one auxiliary valve is integrated in a casing of a disynchronisable motor.

12. Vehicle according to claim 9, wherein each of the motors comprises a cylinder block and an internal fluid distributor with distinct pairs of grooves, the number of said distinct pairs of grooves being equal so said first number of motors, the cylinder block housing groups of cylinders corresponding to the sub-motors, the number of said groups of cylinders and the number of said corresponding sub-motors being both equal to said first number of motors, said groups of cylinders exchanging fluid through said pairs of grooves of the fluid distributor.

13. Vehicle according to claim 9, wherein said hydraulic transmission circuit further comprises a valve device adapted for connecting the sub-motors of said motors in parallel to the common feed duct and the common exhaust duct, while disconnecting the serial ducts.

14. Vehicle according to claim 13, wherein said valve device comprises two-position valves interposed on the serial ducts, each having three ports, i.e. a port on a first side connected to an inlet or an outlet of a sub-motor, a port on a second side connected to the common feed or the common exhaust of the system, the other port on the second side being connected to a serial duct.

* * * * *